July 13, 1948.　　　　J. C. MYERS　　　　2,445,235
AIRCRAFT WITH BLAST OR LIKE
TUBE AND CLOSURE THEREFOR
Filed Feb. 15, 1944　　　　　　　　3 Sheets-Sheet 1
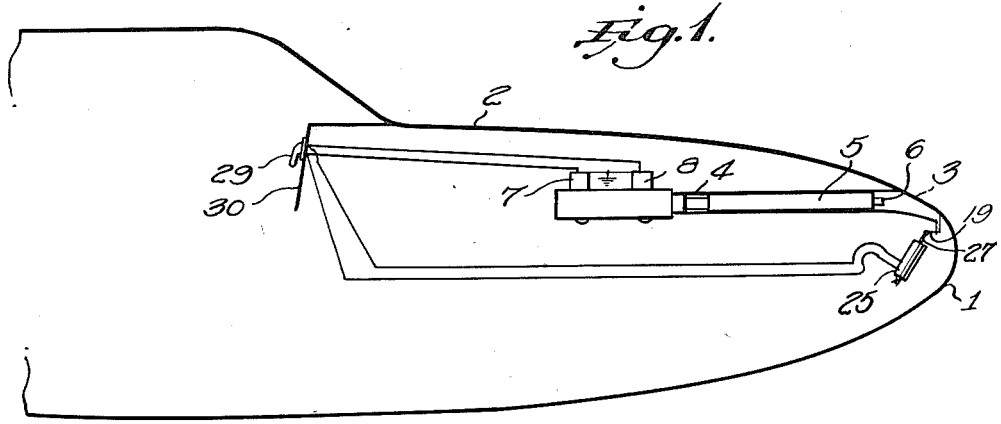
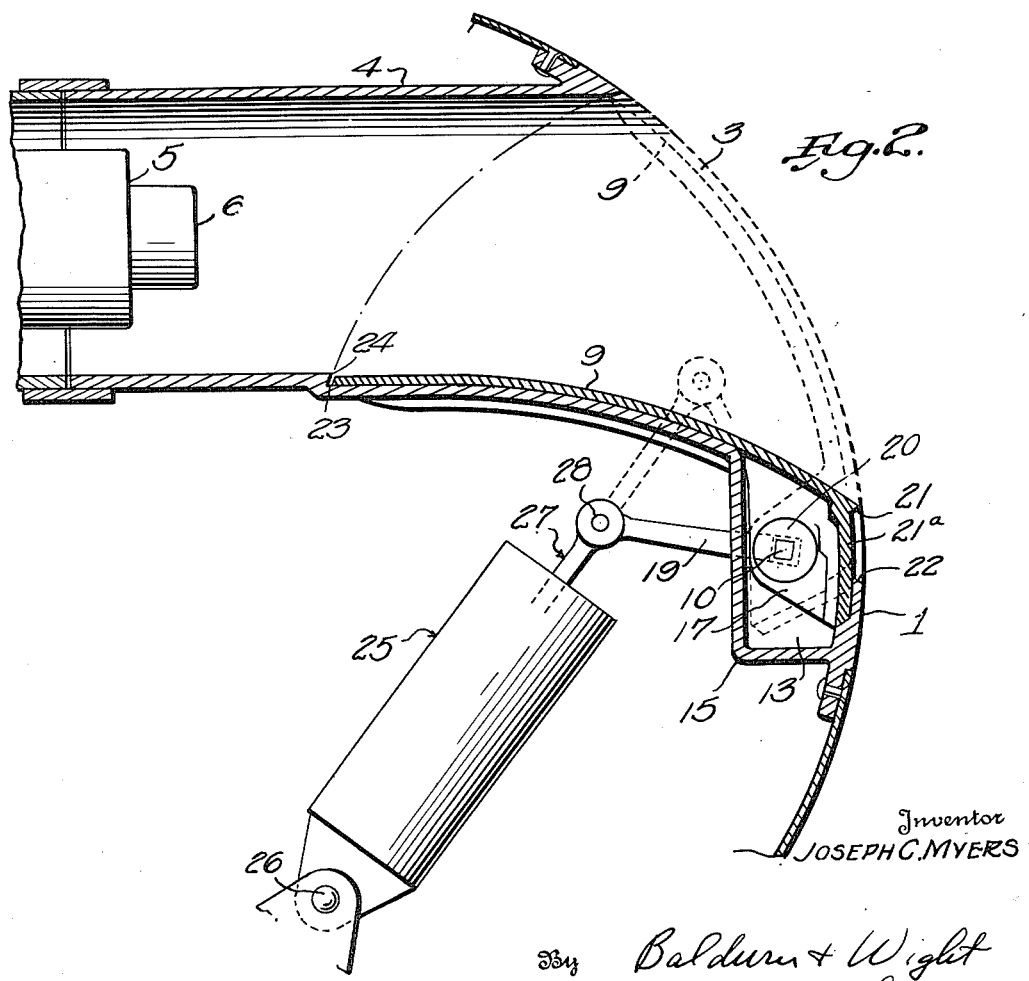
Inventor
JOSEPH C. MYERS
By Baldwin & Wight
his Attorneys July 13, 1948.　　　　J. C. MYERS　　　　2,445,235
AIRCRAFT WITH BLAST OR LIKE
TUBE AND CLOSURE THEREFOR
Filed Feb. 15, 1944　　　　　　　　　　3 Sheets—Sheet 2
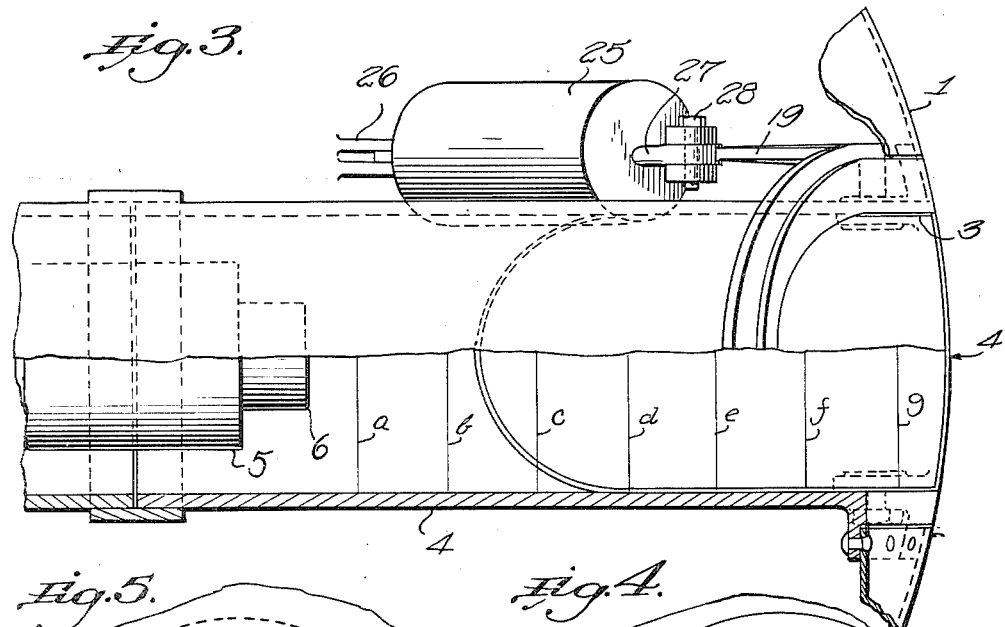
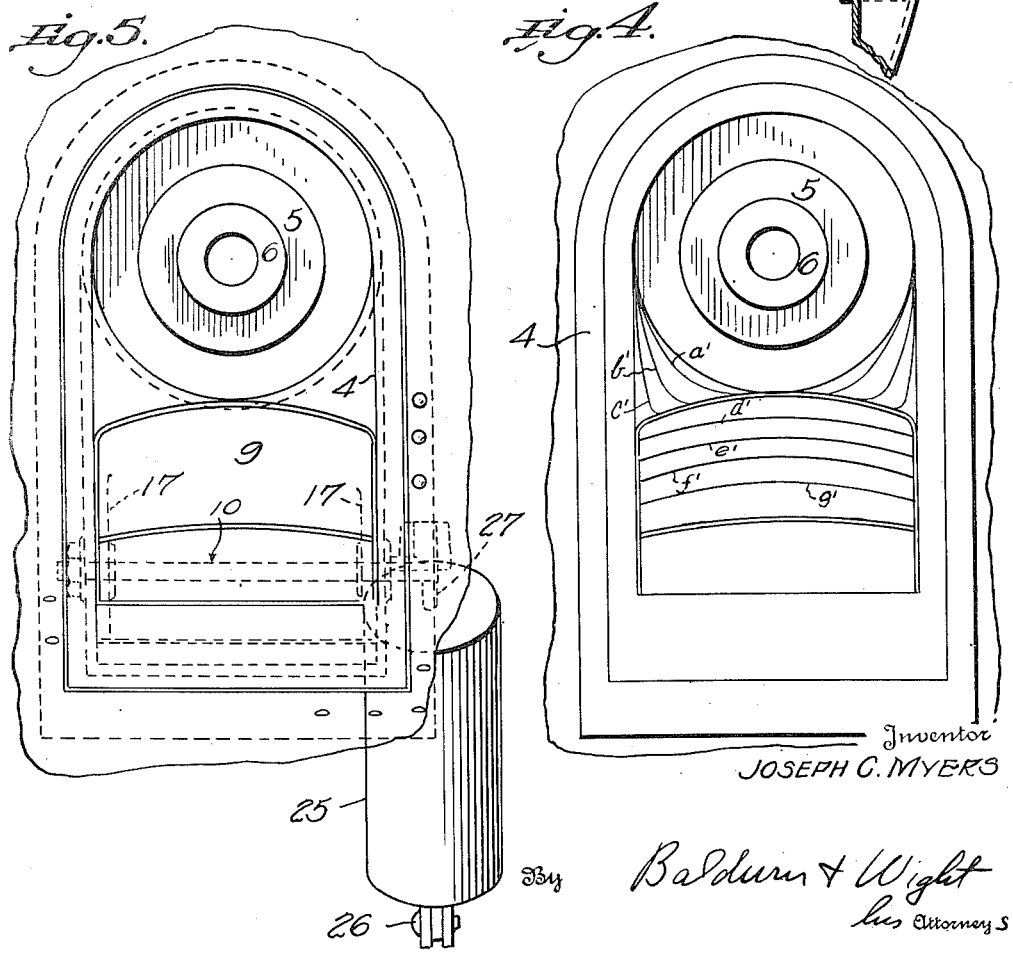
Inventor
JOSEPH C. MYERS
By Baldwin & Wight
his Attorneys July 13, 1948.          J. C. MYERS          2,445,235
AIRCRAFT WITH BLAST OR LIKE
TUBE AND CLOSURE THEREFOR
Filed Feb. 15, 1944          3 Sheets-Sheet 3
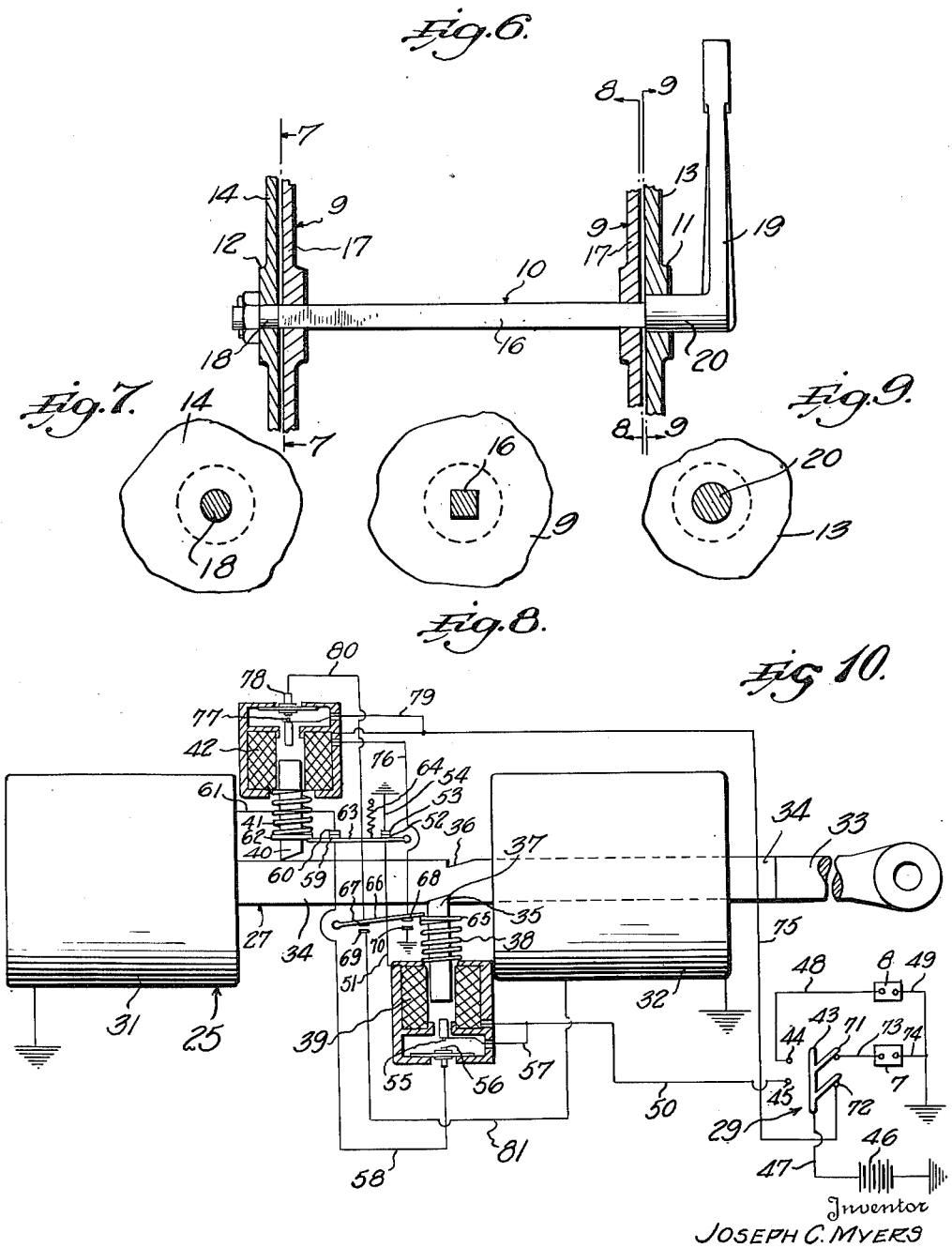
Inventor
JOSEPH C. MYERS
By Baldwin & Wight
his Attorneys Patented July 13, 1948

2,445,235

UNITED STATES PATENT OFFICE 2,445,235

AIRCRAFT WITH BLAST OR LIKE TUBE AND CLOSURE THEREFOR

Joseph C. Myers, Arlington, Va.

Application February 15, 1944, Serial No. 522,469

10 Claims. (Cl. 89—37.5)

This invention relates to aircraft and more particularly to mechanism for opening and closing an aperture in an exterior surface subject to air pressure during flight.

In many types of aircraft, openings or apertures are provided in such surfaces for affording communication between the interior of the aircraft structure and the exterior thereof, the openings serving numerous and diverse purposes.

A general object of the invention is to provide a closure for such an opening which is so mounted that it may be moved selectively to closed position or to open position in which it preferably is disposed inside the aircraft.

Another object of the invention is to provide a closure of the kind referred to which is so shaped relatively to the associated outer surface of the aircraft that when in closed position the closure will merge smoothly with the aircraft surface so that the latter will be continuous and most conducive to streamline air flow.

In one application of the invention, means of the character referred to is provided for closing the end of a blast tube when a gun mounted therein is not in use, the closure being so shaped and mounted that when in closed position it reduces wind resistance or drag. In many combat aircraft inboard guns are mounted in blast tubes which prevent the blast incident to firing from working into the interior of the aircraft. The rear ends of the tubes are closed and their front ends terminate at an outer surface of the aircraft subject to air pressure incident to flight. Usually the front ends of the blast tubes are left open all the time so that the smooth flow of air over the aircraft outer surface is interrupted and the disturbed air currents cause a drag and consequent reduction of the flight speed, rate of climb, and maneuverability. This operates as a severe handicap when going out on a mission before action is joined and when returning from a mission after combat. Heretofore it has been proposed to cover the front ends of blast tubes with frangible closures which could be destroyed by the projectiles when firing is started. Such closures could overcome the ordinary disadvantages of an open blast tube when an aircraft is on its way to the combat zone, but it would not be possible to close the tube after combat and before returning to base.

Another object of the present invention is to provide a closure for an aircraft gun blast tube so mounted that it may be moved selectively to tube-closing position or to a position, preferably inside the blast tube, out of the line of fire.

Another object of the invention is to provide a construction of the character stated in which the closure may be operated by remote control, preferably from the regular station of a crew member.

A further object of the invention is to provide interlocking control means for coordinating the opening and closing of the blast tube closure with the conditioning of the associated gun for firing or on "safety," i. e., so that it can not be fired.

Other objects will become apparent from a reading of the following detailed description, the appended claims, and the accompanying drawings, in which:

Figure 1 is a schematic view in side elevation showing in outline the front part of an aeroplane and indicating generally the application thereto of equipment embodying the invention;

Figure 2 is a fragmentary longitudinal vertical section through the front end of the structure shown in Figure 1;

Figure 3 is a fragmentary view, partly in top plan and partly in horizontal section, of the structure shown in Figure 2;

Figure 4 is a front elevation of a blast tube and gun therein, the shape of the blast tube being indicated by imaginary contour lines;

Figure 5 is a view similar to Figure 4 but showing additionally means for mounting and operating a blast tube closure or door;

Figure 6 is a fragmentary detailed section showing the pivotal mounting of the blast tube closure;

Figures 7, 8, and 9 are sections respectively on the lines 7—7, 8—8, and 9—9 of Figure 6; and Figure 10 is a diagrammatic view of means for coordinating the operation of the blast tube closure and the conditioning of a gun in the blast tube either to fire or so that it cannot be fired.

As is well known, guns are mounted in blast tubes at different parts of an aircraft, for example, at the leading edges of wings, behind waist or side surfaces, and in the fuselage leading ends or noses. The accompanying drawings show a preferred illustrative embodiment of the invention in connection with the mounting of a blast tube and gun in a fuselage nose having a leading surface 1 at the front of the fuselage generally designated 2. The leading surface 1 is formed with an opening 3 which registers with the front end of a blast tube 4 in which is mounted a gun 5 positioned to fire through the opening 3 with its muzzle end 6 spaced inwardly from the surface 1. The gun is equipped with a safety control 7 for conditioning the gun so that it cannot be fired and with a gun charging control 8 for conditioning the gun for firing. The parts thus far described may be of any suitable or known construction and may be arranged in a known manner. The invention resides more particularly in other mechanism to be described and the combination of such other mechanism with some of the conventional parts referred to above.

In accordance with one feature of the invention the leading end of the tube 4 is joined in sealed relationship to the aircraft structure around the opening 3 so that air entering the tube through the opening is confined to the tube and is prevented from entering the interior of the aircraft structure around the tube. A closure or door is provided for closing the opening 3 when the gun is not to be fired, the closure being mounted as a substantially permanent part of the aircraft and being adapted to be moved from its operative or closed position to another position out of the line of fire of the gun 5 and preferably within the blast tube 4. In the form shown the closure comprises a door 9 mounted on a pintle 10 which is pivoted in bearings 11 and 12 formed in opposite sides 13 and 14 respectively of a boxing 15 depending from the front end of the blast tube 4. The pintle comprises a square portion 16 which passes through square openings in ears 17 integral with the door 9 so that the door is constrained to rock with the pintle 10. A round portion 18 at one end of the pintle is journaled in the bearing 12. A crank 19 at the other end of the pintle has a hub 20 forming a continuation of the pintle and extending into the bearing 11 for journaling the adjacent end of the pintle.

By rocking the crank 19 the door 9 can be moved to the position shown in dotted lines in Figure 2 for closing the opening 3 or to the position shown in full lines in Figure 2 wherein the opening 3 is unobstructed and the door is disposed out of the line of fire of the gun 5. The door 9 is formed with a lip 21 adapted to be moved into substantial engagement with an edge 22 at the front end of the blast tube structure when the door is closed so that the door will merge with the contour of the surface 1 providing for the free flow of air during flight and thereby cutting down parasitic wind resistance. When the door is open a skirt 21ᵃ closes the front of the boxing 15 and forms a substantial continuation of the surface 1.

In order that the door will be out of the line of fire of the gun 5 when it is moved into the blast tube, the door is pivoted to rock about an axis eccentric to or spaced from the longitudinal axis of the blast tube 4. The blast tube and door are so correlatively shaped as to enable the door to move to the completely retracted position shown in Figure 2 even though the blast tube is circular in cross section throughout most of its length. Figures 3 and 4 show the shaping of the blast tube as it changes progressively from a transverse plane just in front of the gun 5 to the opening 3 and the corresponding shape of the door 9. In Figure 3 the lines a, b, c, d, e, f, and g indicate a plurality of imaginary planes cutting through the blast tube perpendicularly to its longitudinal axis. In Figure 4 the lines a', b', c', d', e', f' and g' indicate the contours of the blast tube where it is traversed by the imaginary planes referred to. The door 9 is shaped correspondingly and consequently it can be made to close the opening 3, to form a smooth continuation of the surface 1 and also to move completely into the blast tube 4 and against the bottom thereof.

When the gun is fired considerable pressure is generated within the blast tube and this pressure normally would have a tendency to work in under the rear edge of the door 9 when it is in retracted position and thereby to lift the door at least partially and possibly into the line of fire. To prevent this the bottom of the blast tube is formed with a recessed seat 23 adapted to receive the door in its retracted position, the seat preferably being deeper than the thickness of the door so as to provide an exposed seat portion 24 above the door. The rear edge of the door thus is shielded from the gun blast, the blast pressure acts only on the top of the door, and the tendency of the blast to lift the door is eliminated.

In accordance with a further feature of the invention the door 9 is operable by a motor controlled by means accessible to a crew member during flight. The motor may be of any suitable type operable by any kind of power, such as hydraulic, pneumatic, or electrical. In the form shown, a double acting solenoid motor 25 is pivoted to the aircraft structure as at 26 and has a reciprocable plunger 27 pivoted as at 28 to the door crank 19. When the plunger 27 is projected the door will be moved to closed position and when the plunger is retracted the door will be moved to open position. The motor 25 is adapted to be controlled by a switch generally designated 29 mounted on an instrument or control panel 30 at a point remote from the door 9.

The operation of the door or closure 9 is so correlated to the conditioning of the gun by the controls 7 and 8 that when the door is closed the control 7 will set the gun "on safety" and when the door is opened the control 8 will condition the gun to fire. Numerous arrangements for coordinating the door operation with the conditioning of the gun will be apparent to those skilled in the art. Figure 10 shows a preferred one of such arrangements in which the solenoid motor 25 includes two spaced solenoid coils 31 and 32 through which the plunger 27 is reciprocable. The plunger includes a non-magnetic end portion 33 and a magnetic rod portion 34 notched as at 35 and 36.

A latch 37 is pressed by a spring 38 so as to be held in the notch 35 when the plunger 27 is in extended position for positively holding the door 9 closed against the wind pressure. The latch 37 is formed as a solenoid plunger operable in a solenoid coil 39. In order to open the door 9 the solenoid coil 39 and the main solenoid coil 31 are energized. Energizing of the coil 39 withdraws the latch 37 from the notch 35 and permits the plunger 27 to be drawn into the energized coil 31. When the door has been opened the notch 36 will have moved into registration with a latch 40 which will be pressed into the notch by a spring 41, the latch 40 then holding the door positively in open position. The latch 40 is formed as a solenoid plunger operable within a solenoid coil 42. In order to close the door 9 the solenoid coil 42 is energized to release the latch plunger 40 from the notch 36, and a main solenoid coil 32 is energized to move the plunger 27 to the right as viewed in Figure 10 until the door is fully closed whereupon the plunger 37 again enters the notch 35.

Referring in further detail to the means for effecting the correlated control of the gun and door, Figure 10 shows the parts in the positions occupied when the door is closed with the latch 37 holding the main plunger 27 in door closing position. In order to open the door 9 and also condition the gun for firing, a two-armed switch member 43 in the switch 29 is closed upon contacts 44 and 45. This will complete a circuit from a battery 46 through a conductor 47, the switch member 43, the contact 44, a conductor 48, the gun charging control 8, a conductor 49, and the ground, thus operating the control 8 and making the gun ready to fire.

Closing of the switch member 43 on the contact 45 also energizes the latch solenoid coil 39. The circuit through the coil 39 extends from the contact 45 through a conductor 50, the coil 39, a conductor 51, closed contacts 52 and 53, a conductor 54 and the ground. Energizing of the coil 39 releases the latch 37 in the manner previously described.

When the latch 37 is drawn into the coil 39 it engages and presses a spring mounted contact 55 against a contact 56. The conductor 50 is thereby connected through a conductor 57, the contacts 55 and 56, a conductor 58, closed contacts 59 and 60, and a conductor 61 to one end of the solenoid coil 31, the other end of the coil 31 being connected to the ground. In this way the coil 31 is energized immediately after withdrawal of the latch 37 and the main plunger 27 is moved to open the door 9.

When the door has been opened and the latch 40 moves into the notch 36, a collar 62 on the latch will depress an arm 63 against the urge of a holding spring 64 so as to separate the contacts 52 and 59 mounted on the arm from their associated contacts 53 and 60. When the latch 37 was withdrawn from the notch 35 at the beginning of a door opening operation a collar 65 on the latch moved away from an arm 66 to permit the latter to close contacts 67 and 68 upon associated contacts 69 and 70. Thus when the door is open and the gun is conditioned for firing, the latch 40 is engaged in the notch 36, the latch 37 is pressed ineffectively against the surface of the plunger 27 to the right of the notch 35, the contacts 52 and 59 are separated from the contacts 53 and 60 respectively, and the contacts 67 and 68 are closed on the contacts 69 and 70 respectively.

When the gun is not to be fired it should be set on safety and the door 9 should be closed so as to decrease wind resistance and permit faster flight. In order to set the gun on safety and close the door, the switch member 43 is closed upon contacts 71 and 72. A circuit will then be completed from the battery 46 through the conductor 47, the switch member 43, the contact 71, a conductor 73, the safety control 7, and a conductor 74 to the ground. Also a circuit will be completed from the battery through the conductor 47, switch member 43, contact 72, a conductor 75, through the solenoid coil 42 to a conductor 76, through closed contacts 68 and 70 to the ground. This will energize the solenoid coil 42 to retract the latch 40 which in turn will close a spring mounted contact 77 on a contact 78. A branch circuit will then be closed from the conductor 75 through a conductor 79, the closed contacts 77 and 78, a conductor 80, the previously closed contacts 67 and 69, a conductor 81, and the solenoid coil 32. Energizing of the coil 32 following retraction of the latch 40 will draw the main plunger 27 toward the right to close the door. When the door has been closed the latch 37 again will move into the notch 35 and the parts will have been restored to the positions shown in Figure 10.

The construction disclosed herein embodies the invention in one preferred form particularly adapted for closing the ends of aircraft gun blast tubes, but it will be understood that the inventive concept may be embodied in other forms and used for other purposes without departing from the invention as defined in the claims.

I claim:

1. An aircraft having a surface subject to air pressure incident to flight and an opening in said surface, a gun mounted on the aircraft in position to fire outwardly through said opening and having its muzzle end spaced inwardly from said surface; a closure for said opening; means mounting said closure on said aircraft as a permanent part thereof to be moved selectively to a position for closing said opening or to a retracted position within said aircraft and out of the line of fire of said gun; gun control means for selectively conditioning said gun to fire or conditioning said gun so that it can not fire; operating means for moving said closure selectively to said two positions; and means interlocking said gun control means and said operating means for effecting movement of the closure to open position when the gun is conditioned to fire and for effecting movement of said closure to closed position when said gun is conditioned so that it can not fire.

2. An aircraft having a surface subject to air pressure incident to flight and an opening in said surface, a gun mounted on the aircraft in position to fire outwardly through said opening and having its muzzle end spaced inwardly from said surface; a closure for said opening; means mounting said closure on said aircraft as a permanent part thereof to be moved selectively to a position for closing said opening or to a retracted position within said aircraft and out of the line of fire of said gun; a motor operatively connected to said closure for moving it selectively to said two positions; means for latching said closure in its said positions; and means for controlling said motor and effecting selective disengagement of said latches.

3. An aircraft having a surface subject to air pressure incident to flight and an opening in said surface, a gun mounted on the aircraft in position to fire outwardly through said opening and having its muzzle end spaced inwardly from said surface; a closure for said opening; means mounting said closure on said aircraft as a permanent part thereof to be moved selectively to a position for closing said opening or to a retracted position within said aircraft and out of the line of fire of said gun; gun control means for selectively conditioning said gun to fire or conditioning said gun so that it can not fire; a motor operatively connected to said closure for moving it selectively to said two positions; means for releasably latching said closure in its two positions selectively; and means interlockingly controlling the conditioning of said gun, the releasing of said latching means, and the operation of said motor.

4. An aircraft having a surface subject to air pressure incident to flight and an opening in said surface, a blast tube mounted in said aircraft interiorly of said surface with its outer end terminating at said opening; a gun mounted in said blast tube with its muzzle end spaced inwardly from said opening; a closure for said opening; means pivotally mounting said closure on said aircraft eccentrically of the blast tube longitudinal axis to be swung selectively to a position for closing said opening or to an inner position within said blast tube and out of the line of fire of said gun, said mounting means being offset laterally of said blast tube and said blast tube and said closure being so correlatively shaped as to enable said closure, when in said inner position, to lie snugly against a portion of the blast tube inner surface; operating means mounted in said aircraft; and means connecting said operating means to said closure for swinging said closure selectively to said two positions, said operating means and said connecting means being disposed entirely outside the blast tube when said closure is in both of said positions.

5. An aircraft having a surface subject to air pressure incident to flight and an opening in said surface, a blast tube mounted in said aircraft interiorly of said surface with its outer end terminating at said opening; a gun mounted in said blast tube with its muzzle end spaced inwardly from said opening; a closure for said opening; means pivotally mounting said closure on said aircraft eccentrically of the blast tube longitudinal axis to be swung selectively to a position for closing said opening or to an inner position within said blast tube and out of the line of fire of said gun, said mounting means being offset laterally of said blast tube and said blast tube being formed internally adjacent its outer end with a recessed seat adapted to receive said closure when the latter is moved to said inner position so that said closure in said position will merge smoothly with the inner contour of said blast tube; operating means mounted in said aircraft; and means connecting said operating means to said closure for swinging said closure selectively to said two positions, said operating means and said connecting means being disposed entirely outside the blast tube when said closure is in both of said positions.

6. An aircraft having a surface subject to air pressure incident to flight and an opening in said surface, a blast tube mounted in said aircraft interiorly of said surface with its outer end terminating at said opening; a gun mounted in said blast tube with its muzzle end spaced inwardly from said opening; a closure for said opening; means pivotally mounting said closure on said aircraft eccentrically of the blast tube longitudinal axis to be swung selectively to a position for closing said opening or to an inner position within said blast tube and out of the line of fire of said gun, said blast tube being formed internally adjacent its outer end with a recessed seat adapted to receive said closure when the latter is moved to said inner position so that said closure in said position will merge smoothly with the inner contour of said blast tube, the rear edge of said seat being spaced forwardly of the gun muzzle and said seat rear edge being slightly deeper than the adjacent seated edge of said closure whereby when said closure is in said inner position an exposed portion of said seat rear edge will lie between said adjacent seated edge of said closure and the longitudinal axis of said blast tube; and operating means for swinging said closure selectively to said two positions.

7. An aircraft having a surface subject to air pressure incident to flight and an opening in said surface, a blast tube mounted in said aircraft interiorly of said surface with its outer end terminating at said opening; a closure for said opening; means pivotally mounting said closure on said aircraft eccentrically of the tube longitudinal axis to be swung selectively to an outer position for closing said opening or to an inner position within said tube for leaving the interior of said tube open and substantially unobstructed, said mounting means being offset laterally of said blast tube and said tube being formed internally adjacent its outer end with a recessed seat of a size and depth to receive said closure when the latter is moved to said inner position so that said closure in said position will merge smoothly with the inner contour of said tube; operating means mounted in said aircraft; and means connecting said operating means to said closure for swinging said closure selectively to said two positions, said operating means and said connecting means being disposed entirely outside the blast tube when said closure is in both of said positions.

8. An aircraft having a surface subject to air pressure incident to flight and an opening in said surface, a blast tube mounted in said aircraft interiorly of said surface with its outer end terminating at said opening and being joined in sealed relationship to the aircraft structure around said opening so that air entering said tube through said opening is confined to said tube and is prevented from entering the interior of the aircraft structure around the tube; a closure for said opening; means pivotally mounting said closure on said aircraft eccentrically of the tube longitudinal axis to be swung selectively to an outer position for closing said opening or to an inner position with said tube for leaving the interior of said tube open and substantially unobstructed, said mounting means being offset laterally of said blast tube and said tube and said closure being so correlatively shaped as to enable said closure, when in said inner position, to lie snugly against a portion of the tube inner surface; operating means mounted in said aircraft; and means connecting said operating means to said closure for swinging said closure selectively to said two positions, said operating means and said connecting means being disposed entirely outside the blast tube when said closure is in both of said positions.

9. An aircraft having a surface subject to air pressure incident to flight and an opening in said surface, a blast tube mounted in said aircraft interiorly of said surface with its outer end terminating at said opening and being joined in sealed relationship to the aircraft structure around said opening so that air entering said tube through said opening is confined to said tube and is prevented from entering the interior or the aircraft structure around the tube; a closure for said opening; means pivotally mounting said closure on said aircraft eccentrically of the tube longitudinal axis to be swung selectively to an outer position for closing said opening or to an inner position within said tube for leaving the interior of said tube open and substantially unobstructed, said mounting means being offset laterally of said blast tube and said tube being formed internally adjacent its outer end with a recessed seat of a size and depth to receive said closure when the latter is moved to said inner position so that said closure in said position will merge smoothly with the inner contour of said tube; operating means mounted in said aircraft; and means connecting said operating means to said closure for swinging said closure selectively to said two positions, said operating means and said connecting means being disposed entirely outside the blast tube when said closure is in both of said positions.

10. An aircraft having a surface subject to air pressure incident to flight and an opening in said surface, a blast tube mounted in said aircraft interiorly of said surface with its outer end terminating at said opening and being joined in sealed relationship to the aircraft structure around said opening so that air entering said tube through said opening is confined to said tube and is prevented from entering the interior of the aircraft structure around the tube; a closure for said opening; means mounting said closure on said aircraft eccentrically of the tube longitudinal axis to be moved selectively to an outer position for closing said opening or to an inner position within said tube for leaving the interior of said tube open and substantially unobstructed said mounting means being offset laterally of said blast tube and said tube and said closure being so correlatively shaped as to enable said closure, when in said inner position, to lie snugly against a portion of the tube inner surface; operating means mounted in said aircraft; and means connecting said operating means to said closure for moving said closure selectively to said two positions, said operating means and said connecting means being disposed entirely outside the blast tube when said closure is in both of said positions.

JOSEPH C. MYERS.

REFERENCES CITED

The following references are of record in the file of this patent:

UNITED STATES PATENTS

| Number | Name | Date |
| --- | --- | --- |
| 1,186,023 | Moore | June 6, 1916 |
| 1,744,889 | Hammons | Jan. 28, 1930 |
| 1,747,563 | Yonkese | Feb. 18, 1930 |
| 1,962,390 | Gerdes | June 12, 1934 |
| 2,152,053 | Jenkins | Mar. 28, 1939 |
| 2,271,700 | Martin | Feb. 3, 1942 |
| 2,332,419 | White | Oct. 19, 1943 |
| 2,335,090 | Swiech | Nov. 23, 1943 |
| 2,373,088 | Allen | Apr. 10, 1945 |

FOREIGN PATENTS

| Number | Country | Date |
| --- | --- | --- |
| 269,758 | Italy | Dec. 2, 1929 |
| 804,838 | France | Aug. 10, 1936 |
| 464,691 | Great Britain | Apr. 22, 1937 |
| 537,234 | Great Britain | June 13, 1941 |